Oct. 8, 1963 W. C. ALBERTSON, JR 3,106,293
METHOD AND APPARATUS FOR SORTING OBJECTS BY SIZE
Filed June 13, 1960 6 Sheets-Sheet 4

INVENTOR.
WILLIAM C. ALBERTSON, JR.
BY Owen & Owen
ATTORNEYS

Oct. 8, 1963    W. C. ALBERTSON, JR    3,106,293
METHOD AND APPARATUS FOR SORTING OBJECTS BY SIZE
Filed June 13, 1960    6 Sheets-Sheet 6

INVENTOR.
WILLIAM C. ALBERTSON, JR.
BY
Owen + Owen
ATTORNEYS

United States Patent Office

3,106,293
Patented Oct. 8, 1963

3,106,293
METHOD AND APPARATUS FOR SORTING OBJECTS BY SIZE
William C. Albertson, Jr., Lakewood, Ohio, assignor to The Mosaic Tile Company, Zanesville, Ohio, a corporation of Ohio
Filed June 13, 1960, Ser. No. 35,468
16 Claims. (Cl. 209—91)

This invention relates to a method and apparatus for sorting objects having a critical dimension and more particularly to a method and apparatus for sorting objects having at least one substantially flat major face and the critical dimension extending across such major face.

The present invention is particularly useful and will be illustrated as embodied in a machine for sorting fired ceramic tiles which are to be subsequently laid on a floor or wall. The dimension across the major face of such a tile is critical because the tiles are laid in matched patterns in which not only must the grouting spaces between tiles remain uniform and in alignment but also the tiles in any particular floor or wall must all be of the same lateral dimensions so that the same number of tiles in one course extends the same distance as that number of tiles in all other courses so as to align the grouting spaces across the surface as well as along the surface.

The "green" blanks for the tiles are all substantially the same size before they are fired; however, a certain amount of shrinkage occurs during firing which is substantially the same in both directions across the major face of each tile; but the degree of shrinkage is not uniform for all tiles, even in a single firing.

If such tiles were packaged together without sorting by size, variations in size would result in a surface having uneven grout lines and would require the justification of the tiles in each course in order to balance out the differences. In other words, so long as all the tiles in any package or group of packages are the same size, it does not matter if tiles in other packages are slightly larger or smaller. Any order for tiles for a particular job is always filled with tiles all having the same size.

It is, therefore, the primary object of the present invention to provide a method and apparatus for selectively sorting objects having a major critical dimension into a plurality of groups each having the same tolerance with respect to the critical dimension.

Another object of the invention is to provide a method and an apparatus for sorting ceramic tiles which are normally transported in face-to-face juxtaposition, the sorting being done by individually gauging the dimension of a major face and, after sorting, for re-assembling the tiles in such face-to-face arrangement for further transporting or packaging.

It is a still further object of the invention to provide a method for sorting thin objects having parallel main faces, such as ceramic tile, at high speed by dissociating each tile from an array thereof in face-to-face juxtaposition with their corresponding major faces in spaced parallel planes, feeding the tiles in a file along a path with all of their major faces in the same plane, moving those tiles having a dimension greater than tolerable out of such plane, serially selecting from the file those tiles having a major dimension within a defined portion of the over-all tolerance and re-arranging such tiles in face-to-face juxtaposition and serially selecting remaining tiles in groups from the file on the basis of progressively smaller defined portions of the over-all tolerance and re-arranging the tiles in each of said groups separately into face-to-face array.

Other objects and advantages of the invention will be more apparent in the following specification and drawings, in which.

Figure 1:
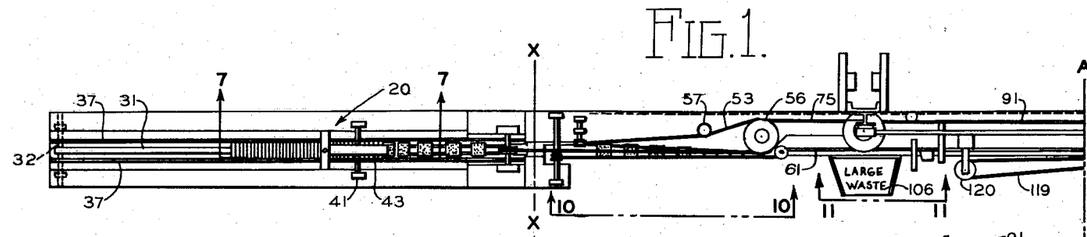
FIG. 1 is a view of the first part of apparatus embodying the invention, partly in plan; the portion to the right of the line X—X being taken from a plane of view tilted rearwardly relative to the horizontal as indicated X—X in FIG. 12.
Figure 2:
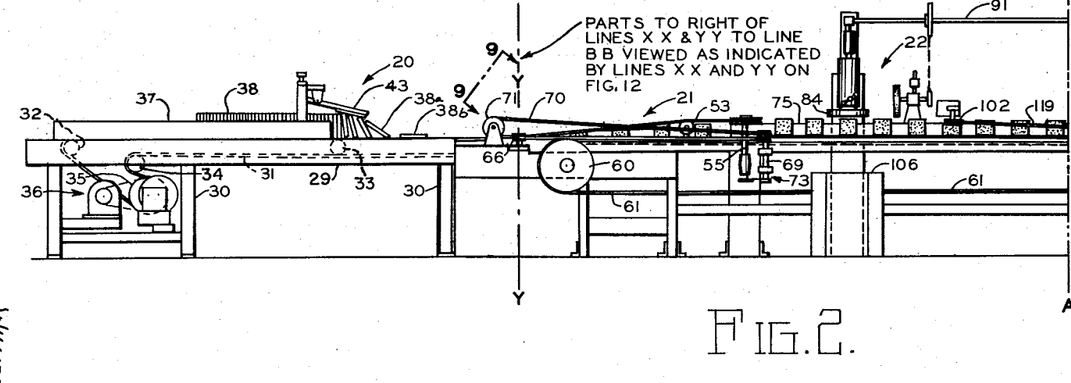
FIG. 2 is a view of the apparatus shown in FIG. 1, partly in front elevation; the portion to the right of the line Y—Y being taken from a plane of view tilted rearwardly relative to the vertical as indicated by the line Y—Y in FIG. 12 and perpendicular to the plane of view of the corresponding portion of FIG. 1.
Figure 3:
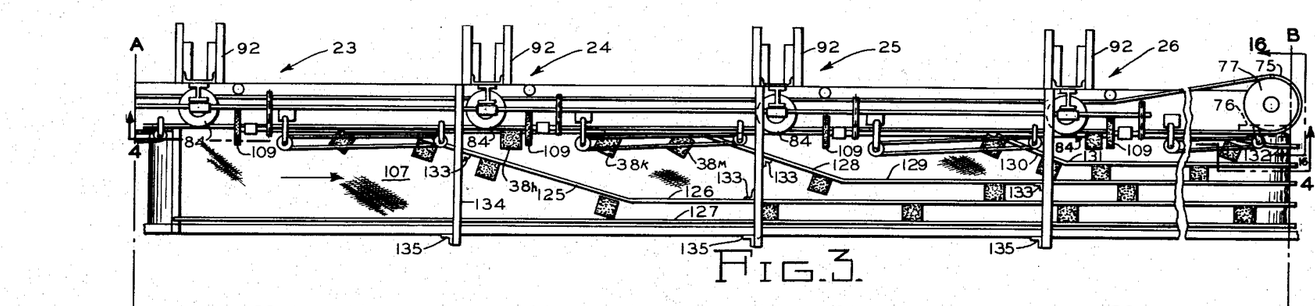
FIG. 3 is a continuation to the right of FIG. 1 showing a second part of apparatus embodying the invention; the plane of view corresponding to that of the right portion of FIG. 1; the line A—A of FIGS. 1 and 3 showing the line of demarcation therebetween.
Figures 4, 15:
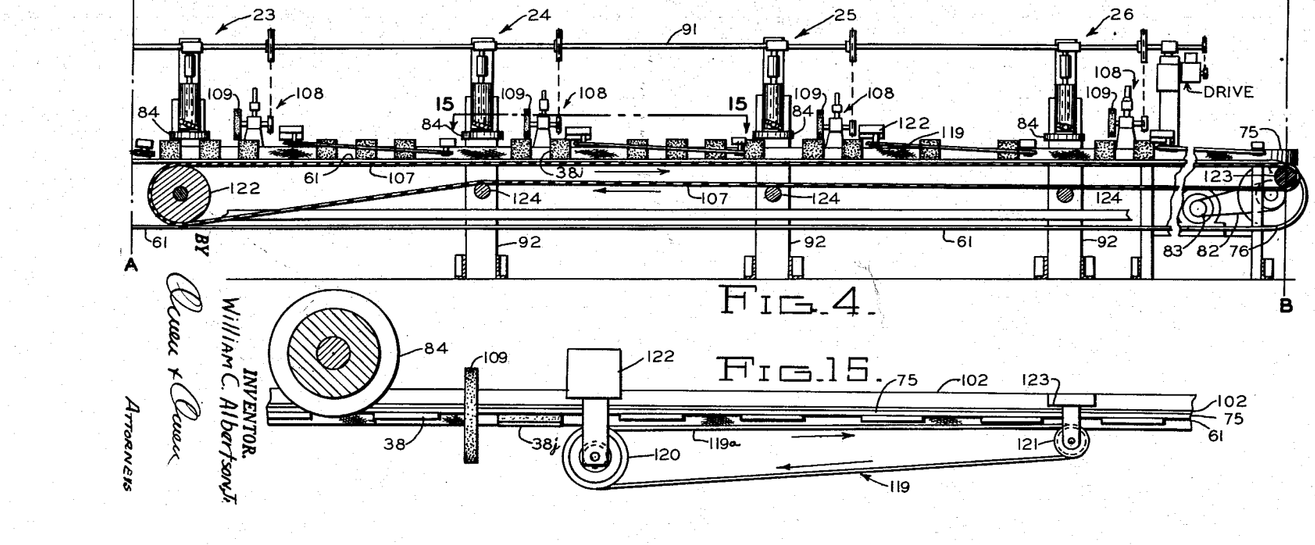
FIG. 4 is a sectional view along the line 4—4 of FIG. 3, and constituting a continuation to the right of FIG. 2.
FIG. 15 is a fragmentary detailed view, with some diagrammatically indicated parts, taken from the position indicated by the line 15—15 of FIG. 4 and shown on an enlarged scale.

Apparatus embodying the invention as illustrated in the drawings comprises a feeder, generally indicated at 20, a turn-up section, generally indicated at 21, and a first sorting station 22, all three of these sub-assemblies being illustrated in FIGS. 1 and 2. The apparatus also comprises a plurality of sorting stations of which four are illustrated in FIGS. 3 and 4 and indicated generally by the reference numbers 23, 24, 25 and 26. It will be appreciated, of course, that while there are five sorting stations illustrated in the drawings, there may be a greater or lesser number of these stations, depending upon the number of portions into which the over-all range of tolerances of the critical dimension of the tiles is divided. Each of the stations 22 and 23–26, inclusive, functions identically and in the later detailed description reference will be made to only one or two of these stations as illustrative of all of them. The four sorting stations 23–26 are illustrated in FIGS. 3 and 4 of the drawings.

Figure 5:
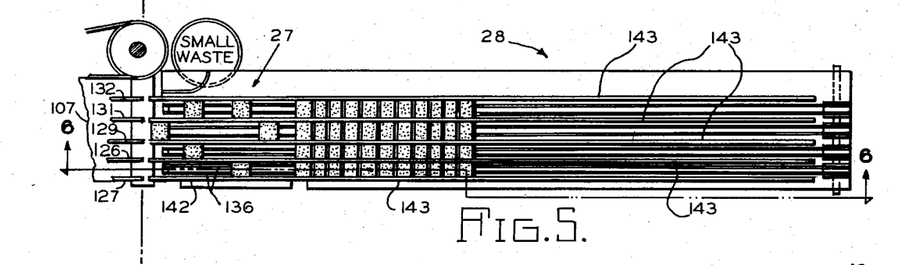
FIG. 5 is a plan view of a third part of apparatus embodying the invention; the figure constituting a continuation to the right of FIG. 3; the lines B—B of FIGS. 3 and 5 showing the line of demarcation therebetween.
Figure 6:
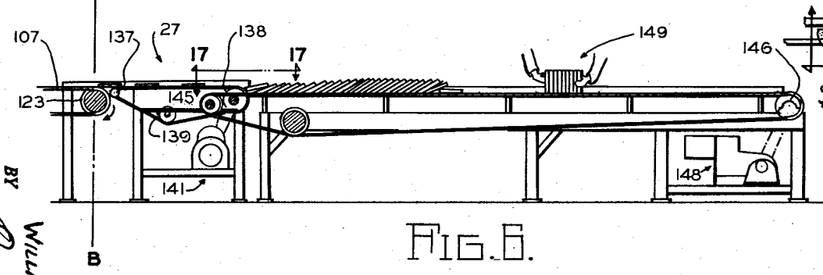
FIG. 6 is a view partly in front elevation and partly in section of the part of the apparatus shown in FIG. 5 and constituting a continuation to the right of FIG. 4; the view being taken along the line 6—6 of FIG. 5.

Apparatus embodying the invention as shown in the drawings also comprises a shingling section, generally indicated at 27, and an off-bearing table, generally indicated at 28, the shingling section 27 and off-bearing table 28 being illustrated in FIGS. 5 and 6.

Figures 11, 12, 13, 14:
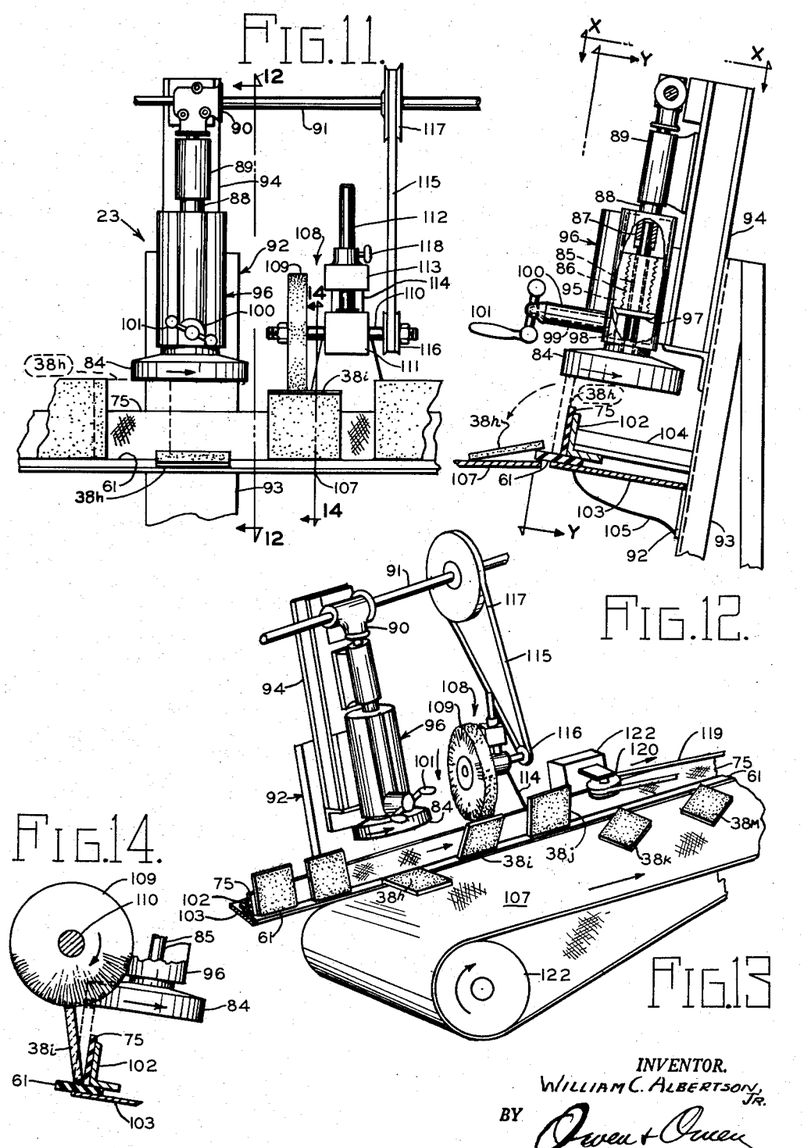
FIG. 11 is a fragmentary view in elevation of one of the sorting stations of an apparatus embodying the invention and taken from the position indicated by the line 11—11 of FIG. 1; shown on an enlarged scale.
FIG. 12 is a fragmentary, sectional view, with parts broken away, taken along the line 12—12 of FIG. 11.
FIG. 13 is a fragmentary view in front perspective of a sorting station.
FIG. 14 is a fragmentary, somewhat diagrammatic view, taken from the position indicated by the line 14—14 of FIG. 11.

Referring to FIGS. 1 and 2 attention is drawn to the legend "Parts to right of lines X—X and Y—Y to line B—B viewed as indicated by lines X—X and Y—Y on FIGURE 12." Preliminary reference to FIGURE 12 shows how a substantial part of an apparatus embodying the invention as illustrated in the drawings is tilted backwardly, i.e., with its upper end toward the right in FIG. 12 or with its upper portion backwardly from the plane of the paper in FIGURES 2 and 4. In order to permit clear depiction of the mechanisms, parts and elements shown in those portions of the machine so tilted, those parts of the drawings in FIGS. 1, 2, 3 and 4 extending between the lines X—X of FIG. 1 and Y—Y of FIG. 2 and the demarcation line B—B of FIGS. 3 and 4, have been drawn as if they were not tilted, i.e., in the plane of lines X—X and Y—Y of FIG. 12.

FEEDER

Figure 7:
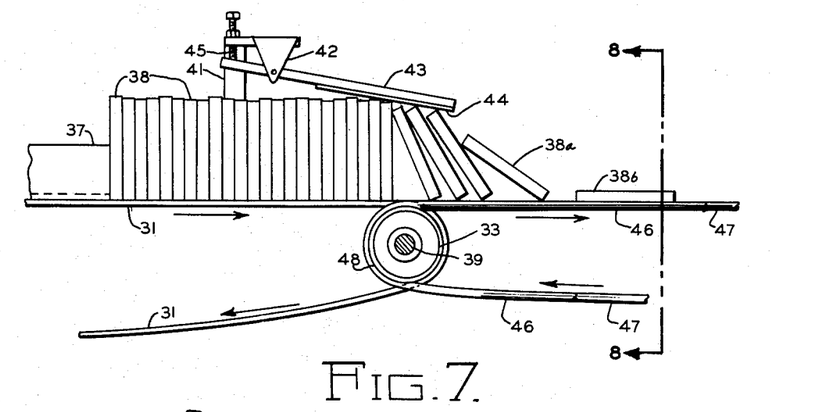
FIG. 7 is a greatly enlarged fragmentary, vertical sectional view taken along the line 7—7 of FIG. 1 and showing tile feeding mechanism with which apparatus embodying the invention is equipped.
Figure 8:
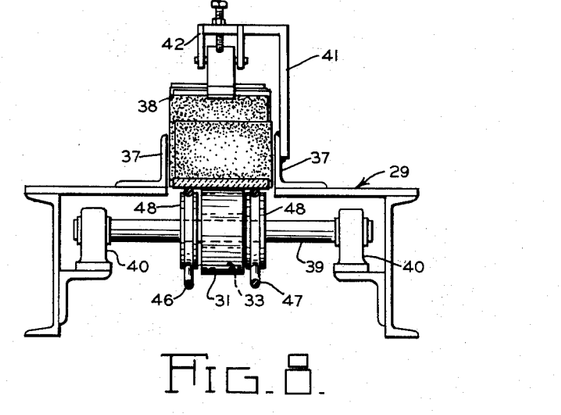
FIG. 8 is a vertical sectional view taken along the line 8—8 of FIG. 7.

The feeder, generally indicated at 20 in FIGS. 1 and 2, is illustrated in detail in FIGS. 7 and 8 to which reference is also made. The feeder 20 has a main table 29 (FIG. 2) erected upon a plurality of support legs 30. The feeder includes a belt 31 passing over a drum 32 at the left side of the table, an idler drum 33 near the right end of the table 29, a second idler drum 34 (FIG. 2) and a drive drum 35. The drive drum 35 is mounted upon a driving mechanism, generally indicated at 36. The belt 31 runs between a pair of parallel vertical guides 37 erected on the table 29 and spaced from each other a distance slightly greater than the maximum dimension of one of the objects being sorted—in this instance a square ceramic tile having a major face approximately 4¼" x 4¼" and a thickness of approximately ⅜". The belt 31 is narrow, say 2" wide for 4¼" tiles and is taut enough so that it supports and conveys an array of tiles 38 in close face-to-face juxtaposition on edge between the guides 37. The tiles 38, as explained above, vary in their dimension across their major face. This variation is exaggerated in FIG. 7 in order to emphasize and call attention to the variation by which the tiles are sorted according to the invention. The idler drum 33 for the belt 31 is journaled for free rotation about a shaft 39 carried by bearings 40 supported by the structure of the table 29.

An arm 41 (FIG. 8) is welded or otherwise secured to one of the side guides 37 extending upwardly and overhanging the path of movement of the tiles 38. The arm 41 supports a yoke 42 between the arms of which there is pivotally mounted a restraining bar 43. The restraining bar 43 has a friction pad 44 on its under side and an adjusting screw 45 is threaded through a part of the arm 41 and against the rear end of the bar 43 in order to determine the maximum pressure of the friction pad 44 on the upper edges of the tiles 38 as they are moved along by the belt 31.

The feeder also comprises a pair of belts 46 and 47 of circular cross section, which are engaged with pulleys 48 keyed to the shaft 39 concentric with the idler drum 33 of the belt 31 for rotation with the shaft 39. The belts 46 and 47 extend horizontally along the feeder 20 and are engaged at their opposite ends with drive pulleys located beyond the feeder 20 and as a part of the turn-up section 21, which will be described below. The belts 46 and 47 are driven at a speed slightly in excess of the speed of the belt 31 so that as each tile 38 moves beneath the restraining bar 43 its lower edge moves forwardly more rapidly than its upper edge, causing the tiles to sequentially slide down and forward onto the belts 46 and 47 and to be spaced from each other on the belts 46 and 47. A collapsing tile is indicated by the reference number 38a in FIG. 7 and a tile resting on and being transported by the belts 46 and 47 is indicated by the reference number 38b in FIG. 7. As the tiles come to rest upon the feeding belts 46 and 47, they are spaced from each other longitudinally along the machine and fed into the turn-up section by the belts 46 and 47.

TURN-UP SECTION

Figures 9, 16:
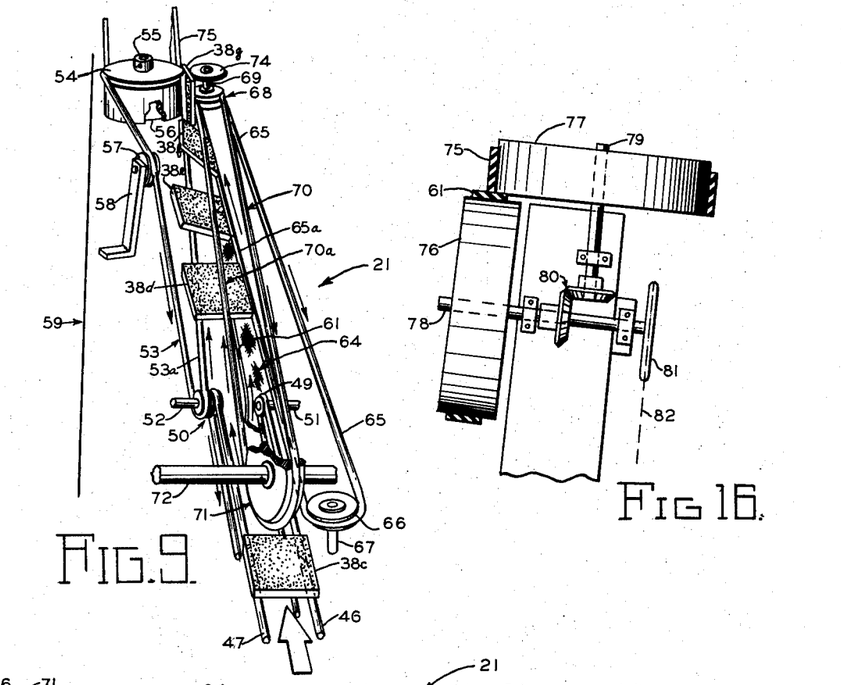
FIG. 9 is a fragmentary top view in perspective of tile erecting mechanism, and on a larger scale, taken from the position indicated by the line 9—9 of FIG. 2.
FIG. 16 is a fragmentary, sectional view taken along the line 16—16 of FIG. 3 and shown on an enlarged scale.
Figure 10:
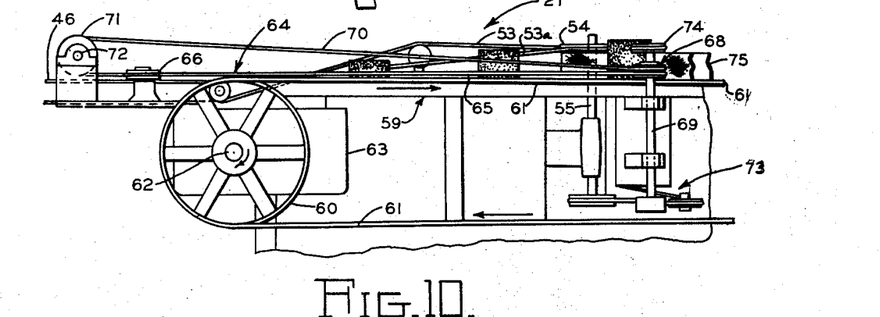
FIG. 10 is a fragmentary front view of the tile erecting mechanism taken from the position indicated by the line 10—10 of FIG. 1, being shown on an enlarged scale.

The turn-up section 21 is shown generally in FIGS. 1 and 2 and in detail in FIGS. 9 and 10 to which reference also is made. The function of the turn-up section 21 is to move or rotate the tiles from their horizontal positions on the belts 46 into a path where all of them will move with their major faces lying in the same plane and erected upon one edge so that they can be gauged across their major face. As explained earlier, the path into which and through which the tiles are sequentially moved is tilted backwardly from the vertical in order that gravity will hold the tiles against the means by which that plane is established and by which the tiles are moved therealong. The turn-up section 21 cooperates with the feeder 20 to carry out the first step of the method according to the invention, namely, the rearrangement of the tiles from the array in substantially face-to-face juxtaposition and with their major faces in parallel planes, into a sequential arrangement with all of their major faces lying in a single common plane and the same edges of all lying in a reference plane perpendicular to that first common plane.

The belts 46 and 47 are engaged with pulleys 48 of the feeder 20 (FIGS. 7 and 8) and at their opposite ends are engaged, respectively, with a pulley 49 and a double pulley 50. The pulleys 49 and 50 are mounted on suitable horizontal shafts 51 and 52. The two belts 46 and 47 thus feed each of the tiles, for example the tile indicated by the reference number 38c in FIG. 9, up to the positions of the two pulleys 49 and 50. The double pulley 50 also is engaged by a lifting belt 53, one span 53a of which moves in the same direction as the upper span of the belt 47 also engaged with the pulley 50. The forward span 53a of the belt 53 extends forwardly through the turn-up section 21 being inclined upwardly and engaged at its far end around a horizontal pulley 54 mounted on a vertical shaft 55 above a drum 56. The belt 53 returns around the pulley 45 and passes over a guide pulley 57 erected on a post 58 above a main table 59 of the turn-up section 21. As can best be seen in FIG. 9, when a tile is moved into the turn-up section 21 by the two horizontal belts 46 and 47, its rear edge (the left edge in FIG. 9) is engaged by the forward span 53a of the belt 53 and lifted progressively upwardly to erect the tile 38 upon its front or lower edge (the right edge in FIG. 9). The progressive erection of the tiles in their movement through the turn-up section 21 is illustrated by comparing the tiles designated by the reference numbers 38d, 38e, 38f and 38g.

The belt 46 at its pulley 49 underlies the upper portion of a belt wheel 60 (FIGS. 1 and 2) which supports and drives a thin, wide belt 61. The belt wheel 60 is mounted upon a horizontal shaft 62 extending laterally out of and driven by a drive mechanism 63. The belt wheel 60 has a smooth cylindrical periphery and its shaft 62 is so spaced beneath the level of the upper surface of the main table 59 and with respect to the shaft 51 of the pulley 49, that the belt 61 on the upper portion of the wheel 60 (in the area generally indicated by the reference number 64 in FIGS. 9 and 10), comes up underneath the forward edge of each of the tiles 38 as it leaves the belts 46 and 47. The belt wheel 60 rotates in a clockwise direction (FIG. 10) so that the upper span of the belt 61 moves in the same direction as the upper span of the belts 46, 47 and 53.

It should be noted that the turn-up section 21 is the first portion of apparatus embodying the invention which is tilted backwardly from the vertical plane. This tilt starts at approximately the position of the belt wheel 60 and the belt 61 carried thereby.

The turn-up section also includes two additional belts the function of which is to hold the front edges of the tiles down and into engagement with the main feeding belt 61 while they are being turned from horizontal to vertical position. The first of these belts in an edge engaging belt 65 running between a small horizontal pulley 66 located at the front part of the turn-up section 21 and mounted upon a vertical shaft 67 and the lower half of a double pulley 68 mounted upon a vertical shaft 69 at the far side of the turn-up section 21. The spans of the belt 65, both its return span and its rear span 65a, lie at the same level and run in the same planes. The rear span 65a overlies the front edge of the main feeding belt 61 a distance such that the front edges of the tiles 38 are grasped between the span 65a and the belt 61 as the tiles move through the turn-up section.

A hold-down belt 70 having a lower and rear span 70a is engaged around the upper half of the double pulley 68 and twisted to run over a vertically oriented pulley 71 mounted on a horizontal shaft 72 which overlies the path of the belts 46 and 47. The pulley 71 has a diameter such that the lower rear span 70a of the belt 70 is spaced above the belts 46 and 47 and the belt 61 so as to engage the tiles 38 only when they are lifted upwardly by the span 53a of the lifting belt 53. Engagement between the rear span 70a of the belt 70 and the tiles is illustrated in FIG. 9 where the span 70a is shown as closely overlying or contacting the three tiles 38d, 38e and 38f.

The shafts 55 and 69 of the pulley 54 and double pulley 68, respectively, are all driven by a drive take-off mechanism, generally indicated at 73 in FIG. 10, which, of course, is carefully synchronized to produce the same lineal speed of the belts 53, 65 and 70 with the feeding belt 61.

MAIN TILE FEED

At the far side of the turn-up section 21, as a tile, for example the tile 38g, reaches its vertical position, it departs from the bite between the lifting span 53a of the lifting belt 53 and the hold-down span 70a of the belt 70 and is held back against the belt span 53a by a guide roller 74 mounted at the upper end of the shaft 69. The guide roller 74 presses each tile not only against the portion of the belt 53 running around the pulley 54 but also against a vertical feeding belt 75 running around the drum 56. The belt 75 extends at right angles to the belt 61 (see also FIG. 16) and the two belts 75 and 61 extend throughout the length of that part of the apparatus shown in FIGS. 3 and 4. At the far side of the sorting portions of the machine, i.e., at the right side of FIGS. 3 and 4 of the machine (see also FIG. 16), the two belts 61 and 75, respectively, are engaged with and driven by two drive drums 76 and 77. The two drums 76 and 77 are mounted upon shafts 78 and 79, respectively, and the two shafts 78 and 79 are suitably mounted by conventional bearings, each carrying one of a pair of bevel gears 80 and the shaft 78 having a drive sprocket 81 on its innermost end. The sprocket 81 is engaged by a drive chain 82 (see also FIG. 4) which is driven by a motor or other drive means 83. The two drive drums 76 and 77 are thus driven in synchronism with each other and their two cooperating feeding belts 61 and 75 are driven at the same lineal speed.

It should be kept in mind that the belts 61 and 75 function as supports and feeding means for feeding the tiles through the machine in a common path and that they also determine the first common plane into which the major faces of all the tiles are moved as they are erected for sorting purposes. The belt 61 functions not only as a feeding belt with the belt 75, but also determines the base or reference plane with respect to which the dimension across the major face of the tile is gauged. The two belts 61 and 75 are constantly running belts operating, as mentioned, at a speed substantially identical with the several belts of the turn-up section so that once the tiles 38 have been fed by the feeder 20 into the turn-up section 21, they move sequentially and progressively through the apparatus on the belts 61 and 75 until each of them is measured or gauged and removed from the two feeding belts 61 and 75 by gauging mechanism to be later described.

GAUGING STATIONS

In an apparatus embodying the invention as illustrated in the drawings, five gauging stations are provided. The first of these stations, indicated by the reference number 22, while identical in its essentials with the gauging stations 23–26, inclusive, is positioned and adjusted to discard all tiles having a critical dimension across their faces greater than an established maximum dimension or, conversely, to allow to pass only tiles having a critical dimension less than a minimum for the station 22. Each of the subsequent gauging stations 23–26, inclusive, is so adjusted as to select those tiles having critical dimensions falling within that portion of the over-all tolerance range which is less than the minimum of the next preceding station and greater than the minimum for the station in question. In accordance with an earlier explanation, the gauging stations 22 and 23–26, inclusive, may be set with respect to nominal 4.25″ by 4.25″ tiles as follows:

| Gauging Station | Critical Dimension In Inches | | Disposition |
| --- | --- | --- | --- |
| | Max. | Min. | |
| 22 | >4.314 | 4.314 | Waste. |
| 23 | >4.314 | 4.282 | Select. |
| 24 | >4.282 | 4.25 | Do. |
| 25 | >4.25 | 4.118 | Do. |
| 26 | >4.118 | 4.086 | Do. |
| | <4.086 | | Waste. |

Figure 19:
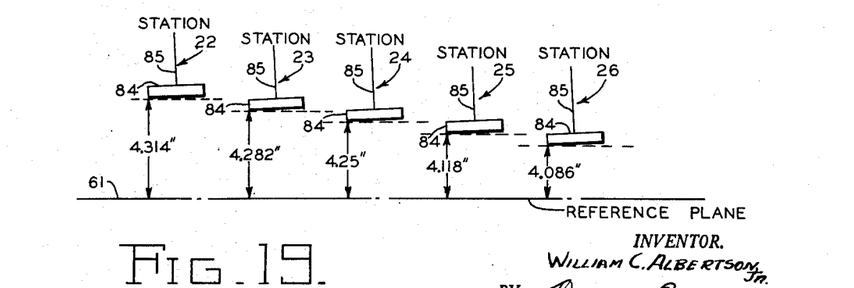
FIG. 19 is a diagram showing the spacing of main gauging means relative to a common reference plane as set up in a specific apparatus operated according to or embodying the invention.

(Reference is also made to FIG. 19.)

All tiles having a critical dimension less than this last minimum size are discarded because none of them is selected by any of the stations 23–26, inclusive, so they are merely thrown out of the far end of the machine as will later be described.

Each of the gauging stations 22–26, inclusive, is substantially identical with the others so that a description of one will suffice for the most part, as a description of all. For example, the gauging station 22 (see also FIGS. 11–15) comprises two gauging mechanisms. The first gauging mechanism includes a gauging disc 84 rigidly mounted on the lower end of a substantially vertical shaft 85 that is journaled in a quill 86. The shaft 85, for example, may have a telescoping splined connection, generally indicated at 87, with a socketed drive shaft 88 journaled in a suitable bearing 89 and driven through a right angle drive 90 by a longitudinal main drive shaft 91. The main drive shaft 91 extends the full length of the gauging portions of apparatus embodying the invention and is driven by a suitable drum mechanism at its far end (FIG. 4). Each of the gauging stations is supported by a heavy pedestal, generally indicated at 92, and comprising a U-beam 93 on the upper end of which an I-beam 94 is secured.

The quill 86 is rotatably mounted in a nut 95 which is rigidly fixed in a housing 96 supported on the I-beam 94. At the lower end of the quill 86 there is mounted a ring bevel gear 97 which is circumjacent the shaft 85. The gear 97 is meshed with a bevel gear 98 pinned or otherwise secured on the inner end of an adjusting shaft 99 rotatably journaled in a sleeve 100 extending forwardly from the housing 98. A hand wheel 101 is fixed on the front end of the shaft 99. By rotating the hand wheel 101, micrometer adjustments of the vertical position of the gauging disc 84 may be made.

The planes of the back feeding belt 75 and the bottom feeding belt 61 are determined and maintained by longitudinal guide members including a back angle 102 and a base plate 103. Both the back angle 102 and the base plate 103 are rigidly supported by suitable bracing means, for examples the struts 104 and brackets 105 which are welded or otherwise rigidly mounted on the pedestals 92 and extend forwardly therefrom. The plane of the upper surface of the belt 61 is the reference plane with respect to which the gauging mechanism is preset to select tiles of a certain tolerance.

The center lines of the shafts 85 all lie in the same plane which is parallel to the common plane and perpendicular to the reference plane but the center lines themselves are not perpendicular to the reference plane. All of the shafts 85 are parallel to each other and are tilted a few degrees at their upper ends toward the direction from which the tiles are fed (counterclockwise in FIGS. 2, 4 and 19). As a result, the lower circumferential edge of each of the gauging discs 84, where first contacted by a tile approaching its particular gauging station, is closer to the reference plane than any other part of the gauging disc 84. Unless a tile is contacted by the leading edge of a disc 84 when it first approaches the disc, it will not be contacted by the disc as it passes beneath the disc. Gauging adjustment is made by setting this "front edge" of the gauging disc at the minimum dimension from the reference plane of that portion of the tolerance range which the particular station is to select. Each of the gauging discs 84 thus acts as a gate through which there can pass only tiles having a critical dimension less than the minimum for that station.

A typical spacing of a set of the gauging discs 84 is illustrated in FIG. 19. If a tile, for example the tile indicated by the reference number 38h in FIGS. 11, 12 and 13, has a critical dimension across its face sufficiently large so that it is engaged by the front edge of the gauging disc 84, the direction of rotation of the disc is such that the resultant force applied to the tile 38h causes it to swing forwardly from its inclined position up to vertical and, if the engagement is of sufficient force, over and downwardly. The tile 38h is shown in solid lines in FIGS. 11, 12 and 13 after it has fallen forwardly onto a main table belt 107 to be described below. In FIGS. 11 and 12 the tile 38h is shown in broken lines in its position of initial engagement with the edge of the disc 84.

The spacing of the axes of the gauging discs 84 and their speed of rotation are so selected that the lineal speed of their peripheries where they first engage the tiles is substantially the same as the lineal speed of the tiles on the two feeding belts 75 and 61. The substantial elimination of relative movement between the objects and the gauging means is particularly desirable where the objects being handled are either abrasive or abradable. In the case of frangible objects such as ceramic tile, it also minimizes breakage. Additionally, as can best be seen in FIG. 12, the tiles engage the gauging discs at a point in the common plane well removed from the axes of the discs so that a large component of the force applied by the discs 84 extends along the path of movement of the tiles prior to engagement. The resultant direction is, therefore, inclined away from the path of the tiles at a relatively small angle, minimizing shock. Coupled with the forward inclination of the axes, as described above, which precludes jamming of a tile beneath one of the discs 84, the virtual elimination of relative movement and/or solid impact between tile and gauging means results in an apparatus having long life and easy maintenance. At gauging station 22, of course, when the tiles are engaged by the disc 84 they fall over into a waste container 106 (FIGS. 1 and 2) for discard. At gauging stations 23–26, inclusive, the tiles fall upon their faces on the main table belt 107 (as illustrated by the tile 38h). The belt 107 extends the full length of the parts of the machine illustrated in FIGS. 3 and 4, i.e., those parts including the gauging stations 23–26, inclusive.

The force applied to each tile by a gauging disc 84 is spoken of herein and in the appended claims as a "first force." The value of the force applied by a gauging disc 84 to the tile 38 is, of course, determined by the critical dimension of the particular tile, i.e., by its excess over the minimum tolerance for such dimension in that portion of the over-all tolerance range to which the particular station is appurtenant. If the particular tile in question, for example the tile 38h of FIGS. 11 and 12, has a critical dimension appreciably greater than the minimum the tile is firmly engaged by the rotating gauging disc 84 and a force applied to it of sufficient strength to throw it completely over through the vertical or intermediate position and either into discard or onto the belt 107. Those tiles having a critical dimension sufficient to cause firm engagement with the gauging disc 84 are spoken of as a "first portion" of the tiles selected by a particular gauging station.

If a particular tile has a critical dimension falling near the minimum dimension for a particular station, its force of contact with the gauging disc 84 will be slight. The force applied to the particular tile by the gauging disc 84 may only be sufficient to tilt the tile upwardly to an intermediate position or intermediate plane lying between the plane established by the belt 75 and a plane approximating that of the main table belt 107 or the true horizontal. Such a tile, for example the tile indicated by the reference number 38i in FIGS. 11, 13 and 14, should be included in the tiles selected by the particular gauging station since it has a critical dimension such that the gauging disc 84 engaged it although with insufficient force to deflect it cleanly off of the feeding belt 75.

Each gauging station is equipped with a second gauging means 108. The purpose of the second gauging means 108 is to catch those tiles, such as the tile 38i, which have had a first force applied to them by the gauging disc 84, but the reaction of which to that first force is sufficient only to move the tiles thus weakly contacted to the intermediate plane between the first common plane determined by the belt 75 and the second common plane into which selected tiles are discharged.

This second gauging mechanism 108 includes a cylindrical brush 109 mounted upon a horizontal, longitudinally extending shaft 110. The shaft 110 is journaled in a bearing block 111 carried at the lower end of a rod 112 adjustably mounted in a collar 113 which is carried on the upper end of a pedestal 114 supported by cross structure members (not shown) and the main pedestals 93. The shaft 110 is rotated by a drive belt 115 engaged with a pulley 116 on the shaft 110 and a pulley 117 on the main drive shaft 91. The direction of rotation of the shaft 91 and shaft 110 and, therefore, the brush 109, is such that the lower portion of its periphery moves forwardly from the common plane established by the belt 75 toward the second common plane established by the main table belt 107 and through intermediate planes, for example, an approximate true vertical plane, into which tiles gently touched by the gauging disc 84 (for example, the tile 38i) are moved by the first force applied to such tiles by the gauging disc 84. The vertical position of the shaft 110, and thus the vertical position of the brush 109 relative to the reference plane established by the belt 61, may be adjusted by loosening a setscrew 118 in the collar 113 and sliding the rod 112 up or down.

The distance from the reference plane established by the belt 61 (see FIG. 14) in the first common plane of the front major faces of the tiles 38 to the cylindrical surface of the brush 109 is slightly greater than the minimum tolerance for the station. This slightly greater spacing allows tiles 38, which have not been contacted at all by the gauging disc 84, to continue to move on the belts 75 and 61 past the surface of the rotating brush 109. As can best be seen in FIG. 14, the positioning of the shaft 110 of the cylindrical brush 109 forwardly of the common plane of the tiles on the belts 61 and 75 results in the periphery of the brush 109 at the intermediate plane being closer to the reference plane than it is at the first common plane. When a tile is tilted forwardly by slight engagement of the gauging disc 84, its upper edge swings away from the first common plane and up to a position where it is contacted by the bristles of the brush 109 as it passes beneath the cylindrical gauging mechanism 108.

When a tile, such as the tile 38i, is so tilted from the first common plane into an intermediate plane, a second force is, therefore, applied to its upper edge by the second gauging mechanism 108, specifically by the bristles of the rotating brush 109. Because the tile has already been swung from its backwardly inclined position up to approximately vertical, the second force applied to the tile, though slight, is sufficient in most cases to tilt it forwardly out of the intermediate plane and either (1) to "large waste" in the case of the gauging station 22, or (2) to the second common plane established by the main table belt 107 in the cases of the gauging stations 23–26. These tiles, such as the tile 38i, which are moved from the first common plane to the intermediate plane by the first force and from the intermediate plane to the second common plane by the second force, are referred to in the appended claims as a "second portion" of the tiles being selected. Both those tiles in the first portion selected by the first gauging means and moved from the first common plane to the second common plane by the first force and those tiles selected by the second gauging means and moved from the first common plane to an intermediate plane by the first force and from the intermediate plane to the second common plane by the second force are all considered to constitute a single sorted group for critical dimensions falling within a specified portion of the range of critical dimensions of the tiles being sorted. All such tiles selected by a single gauging station may be packaged and utilized together since the portion of their critical dimension tolerance is so small that no discrepancies will be visible in a surface laid from tiles all selected from such a single group.

Some tiles, including those having a critical dimension just barely above the minimum for a certain gauging station or having a critical dimension barely less than the minimum for that station, may be swung upwardly by vibration or by engagement between the first mechanism and the upper edges of the tiles. For example, if a particle of some kind is lying between the lower edge of a tile and the reference plane established by the upper surface of the belt 61, such tile if firmly engaged would be selected by the gauging station, but if only gently engaged might be swung upwardly an insufficient distance to be engaged by the rotating brush 109 of the second gauging mechanism 108. Such a tile, for example the tile indicated by the reference number 38j in FIGS. 4, 13 and 15, might teeter on the feeding belt 61 and might fall off the feeding belt 61 at some point along its path of travel where such an action would be undesirable. Each gauging station is, therefore, equipped with a restoring belt 119. The restoring belt 119 runs in a pair of pulleys—a driven pulley 120 and an idler pulley 121. The driven pulley 120 is mounted by and driven from a drive housing 122 and the idler pulley 121 rotatably carried by a bracket 123, both the drive housing 122 and its support brackets for the pulley 120 and the bracket 123 being mounted behind the back angle 102. The pulleys 120 and 121 are so positioned that an inner span 119a of the belt 119 runs in front of the feeding belt 75 lying, at the pulley 120 a distance farther in front of the belt 75, and converging toward the belt 75 at the pulley 121. The belt 119 is also inclined downwardly along the path of movement (see FIG. 4). Thus, any tile 38j which might teeter forwardly out of engagement with the feeding belt 75 but not enough to be engaged by the brush 109 is caught by the belt 119 and a third force applied to it for restoring it to the first common plane. Such tiles are spoken of as being tiles the reaction of which to the first or second forces is insufficient for moving such tiles to the second common plane and the action of the belt 119 spoken of as a third force for restoring such tiles to the first common plane.

Of course, all tiles which have a critical dimension less than the minimum dimension for a portion of the tolerance being selected by a particular gauging station will pass freely beneath the gauging disc 84 of that station remaining in their backwardly inclined position on the belts 75 and 61. Such tiles will not be engaged by the second gauging means, i.e., the illustrated brush 109, and will be carried by the belts 75 and 61 along the length of the apparatus until they reach the particular one of the gauging stations 23–26 within whose tolerance range their critical dimension falls or until they pass the last (smallest) gauging station 26 and go on to be discharged as "small waste."

In general, those tiles rejected by the first feeding station 22, because their critical dimensions are greater than the maximum tolerance, are spoken of as a first group of tiles; those tiles within sortable tolerance are all spoken of as a second group of tiles even though the second group of tiles actually is made up of four separately sorted groups, each group having two selected portions.

MAIN TABLE BELT AND GROUPING GUIDES

As explained above, each of the gauging stations 23–26, inclusive, functions to select and deflect all of the tiles whose critical dimension is greater than the minimum for that station. Whether a tile selected by a particular gauging station is selected by the first gauging means comprising the gauging disc 84 or the second gauging means comprising the cylindrical brush 109, the selected tile is tipped forwardly through the intermediate plane and over on its face where it lands upon the table belt 107. The table belt 107 slides over truly horizontal guides (not shown) which are supported from the pedestals 92 and on table legs with the upper surface of the belt 107 lying in a truly horizontal plane. The belt 107 is engaged with a large diameter driving drum 122 at the left or beginning side of the table (FIGS. 4 and 13) and with a smaller idler drum 123 at the right or far side of the main table of the machine. The main table belt 107 returns along the full length of that portion of the apparatus illustrated in FIGS. 3 and 4 beneath the level of its upper span and over a series of support rollers 124. As can most readily be appreciated by reference to FIGS. 12 and 13, the rear edge of the table belt 107 underlies the front edge of the reference plane belt 61 so that when tiles are tipped from the upright position forwardly upon their faces (e.g., from dotted to solid line indications of the tile 38h in FIGS. 11 and 12), their edges remain on the feeding belt 61. This is seen in FIGS. 11–13 where the rear edge of the tile 38h still rests on the belt 61 and in FIG. 3 where a tile, also indicated as 38h, has its rear edge on the belt 61 even though it has been just tipped over by the gauging disc 84 of the gauging station 23. The table belt 107 moves at a lineal speed slightly faster than the feeding belts 75 and 61. Because the edge of each tile as it is tipped over remains on the slower speed belt 61 and its opposite edges or corners rest upon the table belt 107, each tile gradually turns as it moves along. This rotation of each tile can also be observed in FIGS. 3 and 13 where, for examples, a tile indicated, as 38k is shown as turned part way relative to the tile 38h and a tile 38m is shown as being turned still farther by the progressive advance of the table belt 107 relative to the feeding belt 61.

Each of the gauging stations 23–26, inclusive, has a set of grouping guides which deflect the tiles selected by that station into one of a plurality of pathways extending along the table belt 107. Each of these grouping guides consists of an angular portion 125, for example, of the gauging station 24, and a straight portion 126 which serves as a divider between two adjacent pathways on the main table belt 107. A front straight guide 127 extends along the front edge of the main table belt 107 forming with the straight portion 126 a pathway for tiles selected by the gauging station 23. The straight portion 126 and an angular portion 128 with its straight portion 129 similarly function to form a pathway for tiles selected by the gauging station 24. The gauging station 25 has a guide with an angular portion 130 and a straight portion 131 and the gauging station 26 has a short guide 132 of the same general type. As can best be seen by reference to FIG. 3, the several guides cooperate to form four parallel adjacent pathways each of which serves to guide tiles selected by one of the gauging stations 23–26 along the apparatus as they are moved by the main table belt 107.

After passing through the apparatus so far described and being handled according to the method steps discussed above, the acceptable tiles are separated into four groups the critical dimensions of all of which fall within the over-all range of tolerance and each group of which contains only tiles having a critical dimension falling within one portion of that range of tolerance. Excessively large tiles have been rejected to waste by the first gauging station 22. Excessively small tiles, i.e., tiles which have shrunk to such a degree that their critical dimension is less than sufficient to be selected by the final gauging station 26, simply remain on the two belts 75 and 61 passing freely through the gauging station 26 and being discarded into a "small waste" collector by reason of not having been selected (see FIG. 5).

The grouping guides are supported in position over the main table belt 107 by a plurality of vertical struts 133 which depend from overhead cross arms 134 extending transversely above the table belt 107 and supported at their rear ends by the pedestals 92 and at their front ends by struts 135 connected to the main frame of the main table.

SHINGLING SECTION AND OFF-BEARING TABLE

Figure 17:
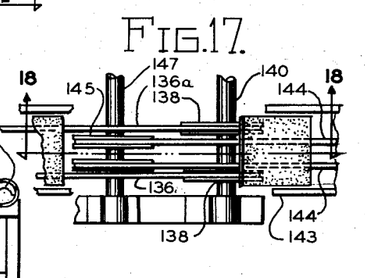
FIG. 17 is a fragmentary detailed view taken along the line 17—17 of FIG. 6 and shown on an enlarged scale.
Figure 18:
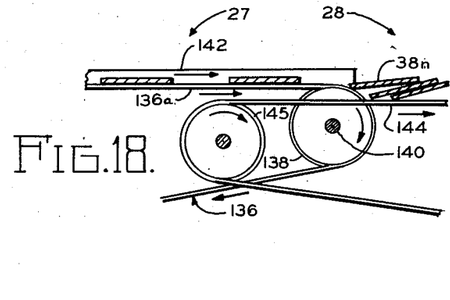
FIG. 18 is a fragmentary, sectional view taken along the line 18—18 of FIG. 17.

FIGURES 5 and 6 and detailed FIGURES 17 and 18 illustrate the shingling section and the off-bearing table. Each of the four parallel paths through the shingling section 27 and the off-bearing table 28 is aligned with one of the paths overlying a portion of the main table belt 107 and formed between the straight guide portions 127, 126, 129, 131 and 132. Each of the paths of the shingling section 27 is formed by a pair of belts 136 which are engaged by idler rollers 137 located closely adjacent the drum 123 of the table belt 107, drive pulleys 138 and tensioning pulleys 139. Upper spans 136a of the belts 136 extend along with their upper surfaces in the plane of the table belt 107 and move at the same lineal speed. The shingling section belts 136 are all driven in unison through a drive shaft 140 on which the pulleys 138 are mounted by a drive mechanism 141. Parallel guides 142 extend across the shingling section acting as continuations of the grouping guides 126, 127, 129, 131 and 132. The belts 136 are driven at the same speed as the table belt 107.

The off-bearing table 28 extends beyond the shingling section 27 and similarly has four paths formed by parallel guides 143. A similar number of pairs of belts 144 extend between idler pulleys 145 at the forward end of the off-bearing table 28 and driven pulleys 146 at the far end of the off-bearing table 28. All of the idler pulleys 145 are mounted upon a single cross shaft 147 and each pair of idler pulleys 145 is positioned between a related pair of pulleys 138 of the shingling section. Thus, each pair of off-bearing table belts 144 runs between a corresponding pair of shingling section belts 136. The horizontal level of the off-bearing table belts 144 is somewhat lower than the horizontal level of the upper spans 136a of the shingling section belts 136. This difference is best illustrated in FIGS. 17 and 18. The off-bearing table belts 144 are driven at lineal speed slower than the speed of the shingling section belts 136 or the main table belt 107 by an independent driving mechanism 148 connected to the shaft for the driving pulleys 146.

As each of the tiles feeds through the shingling section 27 on the belts 136 (see FIG. 18), it is projected outwardly by the upper span 136a of the belts 136 onto the slower moving, lower belts 144 of the off-bearing table. As a result, each successive tile, for example, the tile indicated by the reference number 38n in FIG. 18, overlaps and rests upon the next preceding tile, producing a "shingled" overlapping of the tiles as they are moved along the off-bearing table by the belts 144.

It is thus convenient for an operator who wishes to pick up a group of tiles from one of the pathways on the off-bearing table 28 to place one hand beneath the first of a group of tiles thereon and the other hand at the back of a tile, say twelve, twenty, or more, tiles removed, and by a sweeping motion erect the group of tiles to form a compact, easily handled group, as generally indicated by the reference number 149 in FIG. 6, so as to facilitate his lifting the group of tiles off the off-bearing table 28 and placing the group of tiles either in packages or upon subsequent transporting means along with other tiles falling within the particular portion of the over-all tolerance selected by that one of the gauging stations 23—26 from which all of the tiles in that particular pathway have been delivered.

I claim:

1. A method of sorting objects having parallel major faces and that are arrayed in contact with one another with their major faces lying in parallel planes, each of said objects having a substantially similar dimension across its major face, said dimension of each of a first group of said objects being greater than a first critical value, said dimension of each of a second group of said objects being between said first critical value and a second critical value, and said dimension of each of a third group of said objects being less than said second critical value, said method comprising, sequentially moving all of said objects along a horizontal path through a position wherein their major faces are all in a first common plane, rejecting the objects in said first group, serially moving the objects in said second group to another position wherein the major faces thereof of all of said objects in said second group are in a single second plane which is angularly disposed relative to said first common plane, and moving the objects in said second group into an array with their major faces in parallel planes.

2. A method of sorting thin objects having parallel major faces and which are arrayed in substantial face-to-face juxtaposition for transporting the same from one location to another, each of said objects having a critical dimension across its major face, said dimension of each of a first group of said objects being greater than a first critical value, said dimension of each of a second group of said objects being between said first critical value and a second critical value, and said dimension of each of a third group of said objects being less than said second critical value, said method comprising, sequentially moving said objects out of juxtaposition into a path with their major faces lying in a common plane; sequentially moving said objects along said common plane until each reaches a point related to its critical value within the tolerance between said first and second critical values; rotating each of said objects in said second group of objects out of said first common plane at the related point about an axis parallel to said first common plane for moving their major faces into a second common plane which is angularly disposed relative to said first common plane; moving each of said objects in said second group along said last mentioned plane away from said related point; and sequentially rotating each of said objects in said second group out of said second common plane into substantial face-to-face juxtaposition.

3. A method of sorting relatively thin objects having major faces and which are arrayed in substantial face-to-face juxtaposition for transporting the same from one location to another, each of said objects having a critical dimension across its major face, said method comprising, moving said objects out of said array into a first path with their major faces lying in a first common plane; rejecting any of said objects having a critical dimension greater than a selected maximum; rotating toward a second plane each of said objects having said dimension greater than a selected minimum and smaller than said selected maximum by applying to the same marginal surface portion thereof a first force, the value of which is proportional to the excess of said dimension over said minimum, whereby each of a first portion of said objects having a critical dimension greater than said minimum is rotated to a second path with its major face in a second plane; applying a second force to the same marginal surface portion of each of a second portion of said objects the reaction of which to said first force is sufficient only for rotating said objects to an intermediate path between said first path and said second path, said second force being sufficient for rotating to said second path all such objects in said intermediate path having a critical dimension closer to said minimum by a specified amount than those in said first portion; and applying a third and opposite force to each of a third portion of said objects, the reaction of which to said second force is sufficient only for moving the objects in said third portion toward but not to said second path, for restoring such third portion to said first path; moving said first and said second portions along said second path, and restoring all of said objects in said first and said second portions out of said second path into an array in substantial face-to-face juxtaposition.

4. A method of selecting and sorting relatively thin objects having parallel major faces and which are arrayed in substantial face-to-face juxtaposition with their major faces in contact with one another, each of said objects having a critical dimension across its major faces, said method comprising, moving said objects out of such array sequentially into a file with the same one of their major faces lying in a first common plane and with the same edge of each of said objects lying in a reference plane that is substantially normal to said dimension; moving each of said objects along said first common plane past a member that is spaced from said reference plane a distance equal to the minimum tolerance of said critical dimension; engaging a marginal surface portion of each of said objects having a critical dimension greater than said minimum tolerance with said member and applying thereby a first force, the value of which is proportional to the excess of said dimension over the minimum tolerance thereof whereby each of a first portion of said objects having said dimension greater than said minimum by a selected amount is rotated to a second common plane; applying a second force to the same marginal surface portion of each of a second portion of said objects having said dimension greater than said minimum but less than said first portion and the reaction of which to such first force is sufficient only for rotating said objects in said second portion to an intermediate path between said common first and said common second plane, said second force being sufficient for rotating to said second plane all such objects in said intermediate path having said dimension less close to said maximum and more close to said minimum than those in said first portion, and recollecting all of said objects in said first and second portions in an array.

5. A method according to claim 4 and the step of applying a third and opposite force to each of a third portion of said objects, the reaction of which to said first and second forces is sufficient only for moving the objects in said third portion toward but not to said second plane, for restoring such third portion to said first plane.

6. A method according to claim 4 in which the objects in said first and second portions are recollected by moving the objects in said first and said second portions into a common path along said second common plane; and reorienting all of the objects of said first and second portions into an array in substantial face-to-face juxtaposition.

7. A method according to claim 4 and the steps of similarly applying first and second forces to the objects in a second group.

8. In a method of sorting objects having major faces all lying in a common plane and a critical dimension across such major faces, the steps of rotating each of said objects that has a critical dimension greater than a selected minimum and smaller than a selected maximum about an axis parallel to its major face and perpendicular to the critical dimension from said common plane toward a second common plane by applying to a marginal surface portion thereof a first force, the value of which is proportional to the excess of said critical dimension over said minimum, whereby each of a first portion of said objects having a critical dimension near said maximum is rotated to said second common plane, and applying a second force to the upper edges of each of a second portion of said objects the reaction of which to said first force is sufficient only for rotating said objects to a path intermediate said first and said second common planes, said second force being sufficient for rotating to said second common plane all such objects adjacent said intermediate path having a critical dimension closer to said minimum by a specified amount than those in said first portion, and applying a third force to each of a third portion of said objects, the reaction of which to either of said forces is sufficient only for moving the objects in said third portion toward but not to either said intermediate path or said second common plane, for restoring such third portion of said objects to said first common plane.

9. A method of sorting thin objects each having at least one planar major face and two spaced parallel edges bounding two sides of said major face, said objects each having a critical dimension across said major face normal to said parallel edges, said method comprising sequentially moving said objects into and along a path with their major faces moving along a common plane and a corresponding edge of each moving along a reference plane normal to said common plane at a gauging station; establishing a first gauging means at said gauging station adjacent said path and at a distance from said reference plane equal to the minimum tolerance of said critical dimension for that station; moving said first gauging means in a direction whereby the edge of said first gauging means first approached by each of said objects is moving away from said common plane; establishing a second gauging means near said path at said gauging station and beyond said first gauging means in the direction of movement of said objects, moving said second gauging means along a gauging path transverse to said path of movement of said objects, said gauging path being spaced from the intersection of said common and said reference planes a distance slightly less than the distance between said first gauging means and said reference plane but at least equal to the minimum dimension of that portion of said range of tolerance for said gauging station; whereby objects greater than said minimum tolerance of said critical dimension are contacted firmly by said first gauging means and are positively moved out of said path without contacting said second gauging means and objects contacted less firmly by said first gauging means are moved into contact with said second gauging means and thereby moved farther out of said path.

10. Apparatus for sorting objects each having at least one planar face and two spaced edges bounding two sides of said face, said objects being arrayed in contact with one another with their planar faces lying in parallel planes, each of said objects having a substantially similar dimension across its planar face between said edges, said dimension of each of a first group of said objects being greater than a first critical value, said dimension of each of a second group of said objects being between said first critical value and a second critical value, and said dimension of each of a third group of said objects being less than said second critical value; said apparatus comprising means for moving all of said objects into a first path wherein their planar faces are all in a first common plane and one of said edges of each of said objects is in a reference plane; means for moving said objects along said first path while maintaining said faces in said first common plane and said edges in said reference plane; a plurality of gauging means mounted in spaced relationship along said path, the spacing between said gauging means and said reference plane in said first common plane being progressively less for each of said gauging means along said path in the direction of movement of said objects, each of said gauging means having a portion which contacts said objects having a critical dimension greater than the spacing of said gauging means and which moves said objects out of said path; means for receiving the objects in said second group after they have been moved out of said path; and means for moving the objects in said second group into an array with their planar faces in contact.

11. Apparatus for sorting objects each having at least one planar face and two spaced edges bounding two sides of said face, said objects being arrayed in contact with one another with their planar faces lying in parallel planes and facing in the same direction, each of said objects having a substantially similar dimension across its planar face between said edges, said dimension of each of a first group of said objects being greater than a first critical value, said dimension of each of a second group of said objects being between said first critical value and a second critical value, and said dimension of each of a third group of said objects being less than said second critical value; said apparatus comprising a first horizontally disposed belt for engaging said objects along the lowermost one of said edges and moving said objects in said direction at a first speed, a second belt for sequentially engaging each of said objects along said lowermost edge in the horizontal plane and sequentially moving each of said objects in said direction at a second speed greater than said first speed whereby said object is moved out of contact with the remaining objects and said planar face is moved into contact with said second belt in said horizontal plane; means for moving said objects away from said horizontal plane to a first common plane which is angularly disposed to said horizontal plane whereby all of said objects are sequentially moved through a first position wherein their planar faces are all in said first common plane and said lowermost one of said edges is in a reference plane; a face engaging belt for moving said objects along a path at said second speed while maintaining said faces in said first common plane; an edge engaging belt moving with said face engaging belt at said second speed for maintaining said lowermost one of said edges of each of said objects in said reference plane; a plurality of rotating discs mounted in spaced relationship along said path, the spacings between said discs and said reference plane in said first common plane being progressively less for each of said discs along said path in the direction of movement of said objects, each of said discs having a portion which contacts said objects having a critical dimension greater than the spacing of said disc and moves said objects out of said path, a third, horizontally disposed belt means adjacent said edge engaging belt for engaging the planar surfaces of the displaced objects in said second group after they have been moved out of said path, means for moving said third, horizontally disposed belt means at a third speed greater than said second speed whereby said displaced objects are moved out of contact with said edge engaging belt; a plurality of elongated members overlying said third, horizontally disposed belt means and extending diagonally thereacross, one of said elongated members being spaced from each of said discs in the direction of movement of said displaced objects, each of said elongated members having a surface for engaging the objects displaced at its respective disc and moving the same across said third, horizontally disposed belt means into a file, and a collecting belt below the end of said third, horizontally disposed belt means for receiving the objects in each file of said second group, means for moving said collecting belt at a fourth speed slower than said third speed whereby the objects in each file of said second group are collected into an array with their planar faces in contact.

12. In apparatus for sorting objects each having at least one planar face and two spaced edges bounding two sides of said face, said objects each having a critical dimension across said face, means for moving said objects along a path while maintaining said faces in a common plane and one of said edges of each of said objects in a reference plane, a plurality of discs mounted on shafts and positioned in spaced relationship along said path, each of said discs having a peripheral edge portion facing said moving means and intersecting said common plane, the spacing between said peripheral edge portion at said intersection and said reference plane in said common plane being progressively less for each disc along said path in the direction of movement of said objects, means for rotating each of said discs about the axis of its said shaft whereby objects having a critical dimension greater than each of said spacings are engaged by the moving peripheral edge of a disc and moved out of said path at the disc having said spacing, and a plurality of brushes, one adjacent each of said discs and spaced therefrom in the direction of movement of said objects, each of said brushes having a peripheral surface portion spaced from said common plane and facing said moving means, the spacing between said peripheral surface portion and said reference plane being slightly less than the spacing of the adjacent disc, and means for rotating each of said brushes in a plane angularly disposed to said common plane in a direction whereby said peripheral surface portion is moved in the direction of movement of said objects as they are moved out of said path by said adjacent disc.

13. Apparatus as claimed in claim 12, including restoring means adjacent each of said brushes and spaced therefrom in the direction of movement of said objects, each of said restoring means being positioned for engaging displaced objects between said path and said means and for moving said displaced objects back into said path.

14. Apparatus as claimed in claim 13, wherein said restoring means comprises a belt having a portion converging toward said path, and means for moving said portion in the direction of movement of said objects toward said path at a linear speed equal to the linear speed of said objects.

15. Apparatus as claimed in claim 12, wherein the means for moving said objects comprises a first belt having a surface in said common plane and a second belt having a surface in said reference plane, and means for moving both said belts at the same linear speed.

16. A method of sorting thin objects each having at least one planar major face and two spaced parallel edges bounding two sides of said major face, said objects each having a critical dimension across said major face normal to said parallel edges, said method comprising sequentially moving said objects into and along a path with their major faces moving along a first common plane and a corresponding edge of each moving along a reference plane normal to said first common plane at a gauging station; establishing a planar gauge at said gauging station adjacent said path and parallel to and at a distance from said reference plane equal to the minimum tolerance of said critical dimension; rotating said gauge in its established plane in a direction whereby the edge of said gauge first approached by each of said objects is moving away from said first common plane toward a second common plane angularly disposed relative to said first common plane; establishing a second gauge near said path at said gauging station beyond said planar gauge in the direction of movement of said objects; moving said second gauge through a gauge path including a first point in said common plane spaced from said reference plane a distance greater than said minimum tolerance and a second point in a plane angularly intermediate said first and second common planes and spaced relative to the intersection of said reference plane and said first common plane closer to said reference plane than said planar gauge; rotating said second gauge in a direction whereby the portion of its periphery near said reference plane moves from said first common plane toward said intermediate plane; whereby objects greater than said minimum tolerance which contacting said planar gauge firmly are rotated toward said second common plane with a force inversely proportional to their approach to said minimum tolerance and objects contacting said planar gauge less firmly are rotated thereby into said intermediate plane and by said second gauge to said second common plane.

References Cited in the file of this patent
UNITED STATES PATENTS

| | | |
|---|---|---|
| 1,052,499 | Benson | Feb. 11, 1913 |
| 1,220,801 | Varga | Mar. 27, 1917 |
| 1,369,377 | Benson | Feb. 22, 1921 |
| 1,905,477 | Luce | Apr. 25, 1933 |
| 2,038,652 | Froehlich | Apr. 28, 1936 |
| 2,993,594 | Copping | July 25, 1961 |